United States Patent [19]

Lee et al.

[11] Patent Number: 5,659,555
[45] Date of Patent: Aug. 19, 1997

[54] METHOD AND APPARATUS FOR TESTING PROTOCOLS

[75] Inventors: David Lee, Murray Hill; Krishan Kumar Sabnani, Berkeley Heights; Muharrem Umit Uyar, Sea Bright, all of N.J.

[73] Assignee: Lucent Technologies Inc., Murray Hill, N.J.

[21] Appl. No.: 738,586

[22] Filed: Oct. 29, 1996

Related U.S. Application Data

[63] Continuation of Ser. No. 605,580, Feb. 22, 1996, abandoned, which is a continuation of Ser. No. 109,186, Aug. 19, 1993, abandoned.

[51] Int. Cl.[6] .................. G06F 11/263; G06F 11/277
[52] U.S. Cl. .................. 371/27.1; 395/183.09; 371/25.1
[58] Field of Search .................. 371/22.1, 25.1, 371/27; 364/489, 578; 324/73.1, 158.1; 395/183.09

[56] References Cited

U.S. PATENT DOCUMENTS

| | | | |
|---|---|---|---|
| 4,601,032 | 7/1986 | Robinson | 371/23 |
| 4,604,744 | 8/1986 | Littlebury et al. | 371/27 |
| 4,692,921 | 9/1987 | Dahbura et al. | 371/27 |
| 4,727,549 | 2/1988 | Tulpule et al. | 371/25.1 |
| 4,907,180 | 3/1990 | Smith | 364/578 |
| 4,991,176 | 2/1991 | Dahbura et al. | 371/27 |
| 5,038,307 | 8/1991 | Krishnakumar et al. | 364/578 |
| 5,163,016 | 11/1992 | Har'El et al. | 364/578 |
| 5,228,040 | 7/1993 | Agrawal et al. | 371/22.1 |
| 5,394,347 | 2/1995 | Kita et al. | 364/578 |
| 5,418,793 | 5/1995 | Chang et al. | 371/27 |

OTHER PUBLICATIONS

David Lee et al., "Conformance Testing of Protocols Specified as Communicating FSMs," *IEEE Infocom'93 Proceedings*, vol. 1, 115–127, Mar. 30–Apr. 1, 1993.

A. S. Tanenbaum, "Computer Networks," Prentice–Hall Software Series, 10–16 (1981).

K. Sabnani and A. Dahbura, "A Protocol Test Generation Procedure," *Computer Networks*, 285–297 (1988).

D. M. Kristol et al., "Efficient Gateway Synthesis from Formal Specifications," *Proc. of SIGCOMM'91*, 89–97, Zurich, Sep. 1991.

C. A. R. Hoare, "Communicating Sequential Processes," *Communications of ACM*, vol. 21, No. 8, 666–677 (Aug. 1978).

M. Yannakakis and D. Lee, "Testing Finite State Machines," *Proceedings of the 23rd Annual ACM Symposium of Theory of Computing*, New Orleans, 476–485 May 1991.

C. L. Seitz, "An Approach to Designing Checking Experiments Based on a Dynamic Model," *Theory of Machines and Computations*, Z. Kohavi (ed.), 341–349 (1972).

F. C. Hennie, "Fault Detecting Experiments for Sequential Circuits," *Proc. 5th Ann. Symp. on Switching Circuit Theory and Logical Design*, 95–110, Nov. 1964.

R. Alseliunas et al., "Random Walks, Universal Traversal Sequences, and the Complexity of Maze Problems," *Proceedings of the 20th Annual Symposium on Foundations of Computer Science*, 218–223, Oct. 1979.

D. Brand and P. Zafiropulo, "On Communicating Finite–State Machines," *Journal of the Association for Computing Machinery*, vol. 30, No. 2, 323–342 (Apr. 1983).

(List continued on next page.)

*Primary Examiner*—Emanuel T. Voeltz
*Assistant Examiner*—Eric W. Stamber
*Attorney, Agent, or Firm*—William Ryan; Katharyn E. Olson

[57] ABSTRACT

A method and apparatus is disclosed for conformance testing of protocols specified as a collection of communicating finite state machines (FSMs). A guided random walk procedure is advantageously used to cover a substantial number of transitions in the component FSMs to determine if the FSM output corresponds to the protocol as specified.

5 Claims, 3 Drawing Sheets

U.S. PATENT DOCUMENTS

A. V. Aho, et al., "An Optimization Technique for Protocol Conformance Test Generation Based on UIO Sequences and Rural Chinese Postman Tours," *IEEE Transactions on Communications*, vol. 39, No. 11, 1604–1615 (Nov. 1991).

Robin Milner "Communication and Concurrency," Chapter 5 entitled Bisimulation and Observation Equivalence, 106–128, Prentice–Hall International (UK) Ltd. (1989).

K. K. Sabnani et al., "An Algorithmic Procedure for Checking Safety Properties of Protocols," *IEEE Trans. Comm.*, vol. 37, No. 9, 940–948, Sep. 1989.

METHOD AND APPARATUS FOR TESTING PROTOCOLS

This is a Continuation of application Ser. No. 08/605,580, filed Feb. 22, 1996, now abandoned, which in turn is a Continuation of application Ser. 08/109,186 filed Aug. 19, 1993, now abandoned.

FIELD OF THE INVENTION

The present invention relates to the testing of protocols in general, and more particularly, to a method and apparatus for conformance testing protocols which are specified as communicating finite state machines.

BACKGROUND OF THE INVENTION

Computer networks, i.e. interconnected collections of autonomous computers, provide a variety of services such as electronic mail and fie transfer services. FIG. 1 illustrates the structure of a typical computer network. The first part of the network typically comprises a collection of Machines 102, called hosts, intended for running application programs. The network also includes Communication Subnet 104 linking the hosts. The subnet's job is to carry messages from host to host. The subnet typically comprises two basic components: Switching Elements (or Interface Message Processors, IMPs) 106 and Transmission Lines 108. Each host is connected to one, or occasionally several, IMPs.

Modem Computer networks are typically designed in a highly structured way. To reduce design complexity most computer networks are organized as a series of layers. For example, the Reference Model of Open Systems Interconnection developed by the International Standards Organization (ISO) is a seven layer model. A network architecture based on this model is illustrated in FIG. 2. See, Andrew S. Tanenbaum, *Computer Networks*, Prentice-Hall, Inc., Englewood Cliffs, N.J., 1981.

Computers communicate among themselves in the network to provide services by sending sets of signals to one another over computer networks. The interplay of these signals forms a "protocol" and enables layer n on one machine layer to communicate with layer n in another machine. The purpose of each layer is to offer certain services to higher layers, shielding those higher layers from the details of how the offered services are actually implemented. The entities comprising the corresponding layers on different machines are called peer processes or peer layers. This is a virtual communication since only at the lowest layer is there a physical connection. Adjacent layers communicate through interfaces. The interface defines which primitive operations and services the lower layer offers the higher layer.

A computer protocol must be clearly specified to enable the respective computers on the network to be able to efficiently communicate. When a protocol is implemented in a manner that is different from how it is specified, the respective machines using the protocol will be unable to communicate meaningfully. Protocol standards are typically defined by bodies such as the ISO and CCITT. A method used to implement a protocol in a computer network is illustrated in FIG. 3. Typically in first step 301, a protocol is described in English with perhaps some computer code or diagrams. The protocol of first step 301 must then be specified in a formal computer language. For example, the protocol may be specified in a language called the Protocol Specification Language (PSL) which is similar to a subset of the CCITT recommended Specification Description Language (SDL). In both PSL and SDL a protocol is specified as a collection of communicating finite state machines as indicated in step 303. Once specified in a computer language, the protocol may be processed by a compiler as shown in step 305, as for example from PSL to C code, and the code is then implemented in the network as illustrated in step 307.

More particularly, the protocol is used to generate a precise description (called a formal specification) of the protocol represented as a collection of communicating processes. Each process, represented as a finite state machine (FSM) communicates with other FSMs through input/output (i/o) operations as defined by the specification. An output operation in a process must have a corresponding input operation in another process, and vice,versa. An FSM representation of a protocol specification consists of a set of states, including an initial state, outputs, inputs, next state function, and output function. A state is defined as a stable condition where the FSM rests until an input is applied. The next state function and output function define the state to which an FSM moves and the output it generates after an input is applied. In PSL, for example, a protocol FSM representation may be specified as an input file comprising process definition statements for naming processes; declaration statements specifying the inputs, outputs, states and initial state of a process FSM; and statements defining the transitions that take place when the specified input or output operation occurs. It is convenient to use a directed graph, called a state diagram, to describe the behavior of an FSM. FIG. 3A illustrates an FSM. The directed graph or FSM comprises states or vertices 322 which represent the FSM states and directed edges 324 which represent transitions between states. Each directed edge 324 is labeled with a notation of i/o operations 326 to specify transitions between states 322, and the directed edge points to the next state the entity assumes when the proper input is received.

Before an implementation of a protocol is incorporated into a computer network, it is advantageous to test that the hardware, software, and/or firmware implementation of the protocol conforms to the specification or standard. FIG. 4 illustrates a block diagram for conformance testing. Input signals (i.e. a test sequence or sequence of signals) are applied to specification 406 to generate a first output and to implementation 403 to generate a second output. The outputs of specification 406 and implementation 403 are then compared in fault detector 409. If the outputs are not identical, a fault signal is generated. Analysis of the errors in the output can often detect not only that the implementation is incorrect but also what specific part of the implementation is in error, i.e., it may be used as a diagnostic tool. When a protocol is simple, conformance testing is not a problem. However, when the services provided by a computer network increase, the complexity of the computer protocols typically increases making conformance testing problematic.

The dominant schemes in testing FSMs, such as those used to represent protocols, are structured, such as checking sequences, etc., which are appropriate for testing a single isolated machine. See, F. C. Hennie, "Fault-detecting Experiments for Sequential Circuits," *Proc. 5th Ann. Symp. on Switching Circuit Theory and Logical Design,* pp. 95–110, November 1964; K. K. Sabnani and A. T. Dahbura, "A Protocol Testing Procedure," *Computer Networks,* pp. 285–297, Vol. 15, No. 4, 1988; A. V. Aho, A. T. Dahbura, D. Lee, and M. U. Uyar, "An Optimization Technique for Protocol Conformance Test Generation Based on UIO Sequences and Chinese Postman Tours," *IEEE Trans.*

Comm., vol. 39, no. 11, pp. 1604–1615, November 1991. Mihalis Yannakakis and David Lee, "Testing Finite State Machines," *Proceedings of the 23rd Annual ACM Symposium of Theory of Computing*, New Orleans, May 1991, pp. 476–485. In structured testing, a test based on the structure of the FSMs is designed. However, for protocols specified by communicating FSMs, the size of the structure of the composite machine is formidable thus making structured test generation impractical.

A variety of approaches have been used for conformance testing in which test sequences can be generated that provide good fault coverage, i.e. that exercise all parts of the protocol implementation, with one-third the length of those generated by ad hoc methods. K. K. Sabnani and A. T. Dahbura, "A Protocol Testing Procedure," *Computer Networks*, pp. 285–297, Vol. 15, No. 4 (1988); A. V. Aho, A. T. Dahbura, D. Lee and M. U. Uyar, "An Optimization Technique for Protocol Conformance Test Generation Based on UIO Sequences and Chinese Postman Tours," *IEEE Trans. Comm.*, vol. 39, no. 11, pp. 1604–1615, November 1991. However, these techniques require that the protocol entity under test be modeled at a fairly high level of abstraction as one deterministic finite state machine. Another method of conformance testing involves composing the communicating FSMs into one machine and generating a transition tour of the composed machine. This method also has limitations in that the procedure encounters two obstacles: 1) the well-known state explosion problem, and 2) the fact that internal transitions cannot be fully tested since they are not observable by a tester. Other testing approaches note that an implementation conforms to a specification if both of them can generate the same infinite random trace. This is possible if any only if they have observational equivalence. R. Milner, *Communication and Concurrency*, Prentice Hall, Inc., Englewood Cliffs, N.J., 1989. However, testing conformance by ensuring observational equivalence is complex since there are internal transitions, which are not observable and the behavior of the machines can be nondeterministic.

To detect faults in a protocol implementation, a minimal requirement is to traverse each transition in FSM representation of the protocol at least once. This is a difficult problem because of the well-known state explosion problem. Additionally, some observations have been made about the reachability of FSMs:

1. The following problems are PSPACE-complete: (i) Is a state or a transition of a component machine reachable from the initial state? (ii) Is a state or transition of the composite machine reachable from the initial state? See, M. R. Garey and D. S. Johnson, "Computers and Intractability—A Guide to the Theory of NP-Completeness," W. H. Freeman and Company, New York, 1979.

2. The following problems are PSPACE-complete as a corollary to the first observation: (i) Given two states of a component machine, is one state reachable from the other through internal transitions only? (ii) Given two states of the composite machine, is one state reachable from the other through internal transitions only?

The above observations show the inherent limitation of testing communicating FSMs even in terms of testing each component machine. In the worse case, to construct a checking or input sequence (or even a covering path) of a component machine can take exponential time. In practice, this is out of the question. Furthermore, due to nondeterministic behavior of the machines, the problem becomes undecidable unless some fairness assumptions are made. In addition, there are internal transitions, which can never be observed and be verified to be tested. Therefore, conventional methods of testing a (single) FSM are not applicable for communicating FSMs. Thus them is a need for a method and apparatus for conformance testing of protocols specified a communicating FSMs that generate test sequences with high fault coverage and short sequence length.

SUMMARY OF THE INVENTION

The present invention provides methods for conformance testing of protocols specified as communicating finite state machines. The method advantageously uses a guided random walk procedure to cover almost all transitions in the component FSMs to ensure that the output of the transition conforms to the protocol specification. The states of the FSMs are characterized as either tested or untested, and the transitions are characterized as either internal or external. External transitions are further categorized as untested, weakly tested or tested. Internal transitions are either untested or tested with a confidence measure. The guided random walk generates a testing sequence or signal by selecting an input for an external transition in the priority of untested, weakly tested and tested transitions.

BRIEF DESCRIPTION OF THE DRAWING

Other features and advantages of the invention will become apparent from the following detailed description taken together with the drawings in which.

DETAILED DESCRIPTION

I. Introduction

Figure 1:
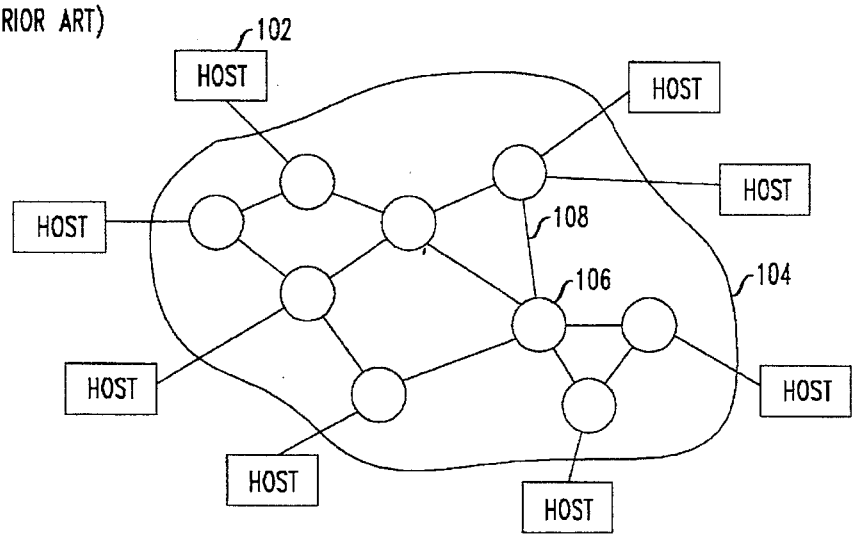
FIG. 1 is a diagram of a computer network.
Figure 2:
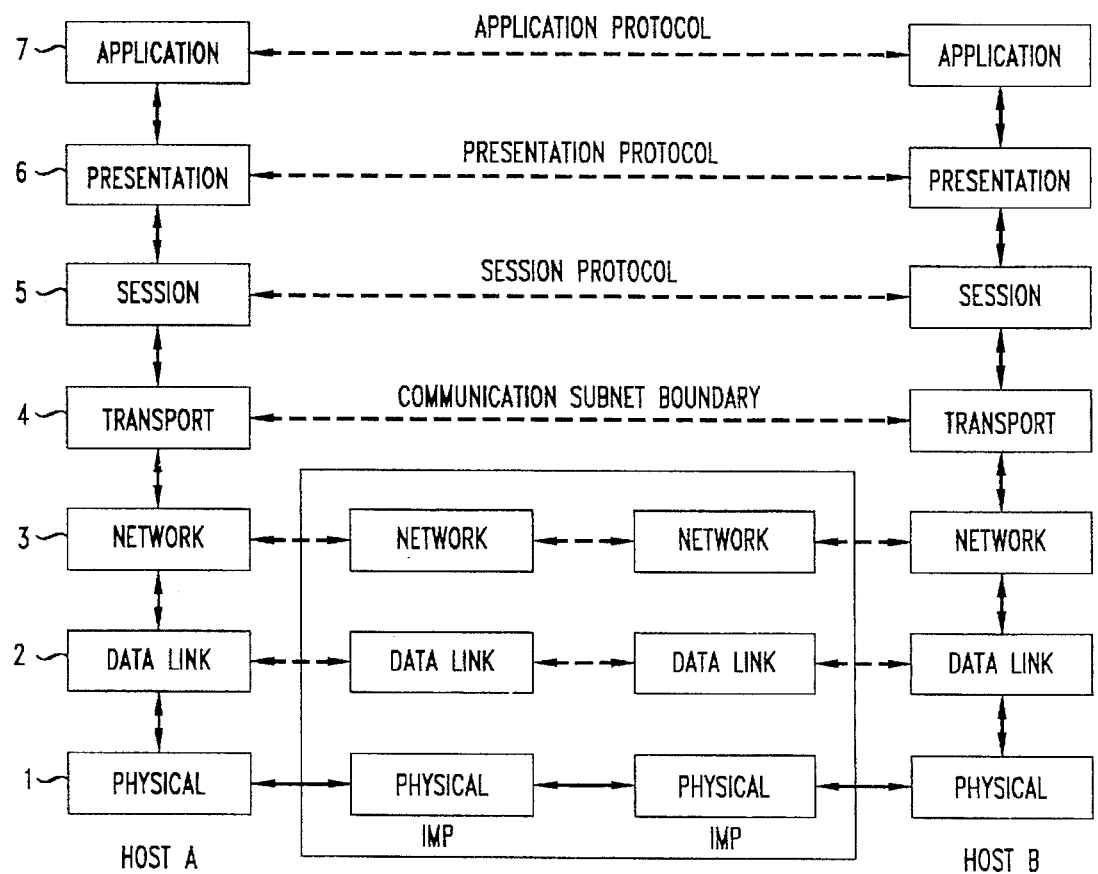
FIG. 2 is a diagram of a network architecture.
Figure 3:
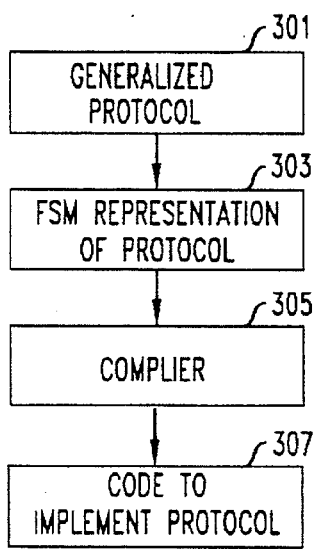
FIG. 3 illustrates a method for implementing a protocol
Figure 3A:
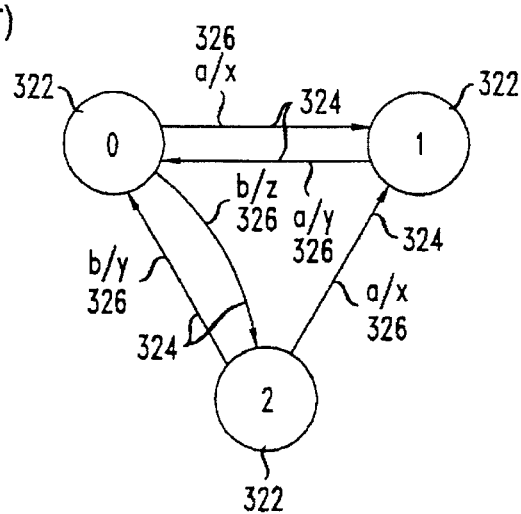
FIG. 3A is a diagram of a finite state machine (FSM).
Figure 4:
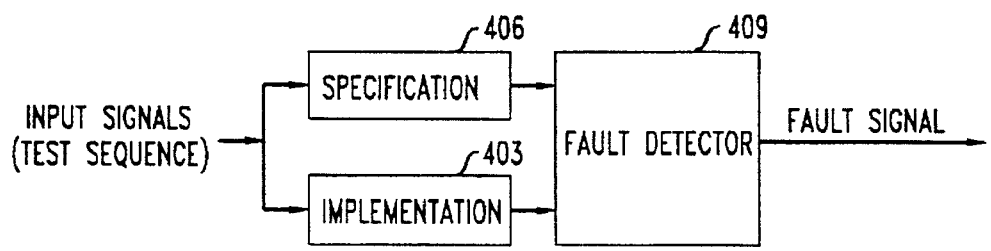
FIG. 4 illustrates a block diagram for conformance testing.

This section presents a detailed description of methods for conformance testing of protocols specified as collections of communicating finite state machines (FSMs). An overview on notation useful in describing FSMs is presented in Section II. Section III presents a detailed description of the invention in which a method and apparatus for conformance testing of protocols are disclosed.

II. Notation

A protocol typically provides multiple services. A service may be described as a collection of communication FSMs. An FSM describes an entity or process where the state of the entity is defined as a stable condition in which the entity rests until a stimulus, called an input, is applied. An input causes the entity to generate an output and to undergo a transition from the current state to a new state, where it stays until the next stimulus. To specify interaction between various machines, interprocess input/output (i/o) operations similar to those used in the language CSP (Communicating Sequential Process) are employed. See, C. A. R. Hoare, "Communicating Sequential Processes," *Communications of the ACM*, Vol. 21, No. 8, 666–677 (August 1978).

For describing a protocol a divide-and-conquer approach may be used in which the protocol is broken up into components where each component can easily be described as an FSM with service primitives as its input/output (i/o) operations. Similarly, communication channels, which have bounded storage, may also be specified as FSMs. Thus, a protocol may be described as a collection of k communicating FSMs, $F_1, F_2, \ldots, F_k$. The FSMs are capable of sending and receiving messages via physical signals over communications channels. These signals physically establish, execute and terminate communications between layers on a network. It is convenient to use a directed graph, called a state diagram to describe the behavior of an FSM. The directed graph comprises vertices which represent the FSM states and directed edges which represent transitions between states. Each directed edge is labeled with a notation of i/o operations to specify interaction between the states, and the directed edge points to the next state the entity assumes when the proper input is received.

An FSM sends a message to other FSMs by means of an "output operation" designated by the "!" symbol. Where, for example, there are two FSMs, machine #1 and machine #2, an output operation in machine #1 is denoted by machine2!msg (i.e., send the message "msg" to machine #2). FSMs also receive messages and for each message that is sent by one FSM there must be a receipt of the message by at least one other FSM.

An FSM receives a message from another FSM by means of an "input operation" designated by the "?" symbol. With respect to the output operation exemplified above, the corresponding input operation in machine #2 is denoted by machine1?msg (i.e., receive the message "msg" from machine #1). NOTE: the operations, machine1?msg and machine2!msg are executed simultaneously because they represent different perspectives of the same event. Neither operation can be executed individually. Thus, if a first FSM attempts to do an output operation, it has to wait until a second FSM is ready to execute the corresponding input operation and vice versa. The synchronized message exchange between two FSMs is called a rendezvous.

When, in an input or output operation, the FSM name is not specified, then the operation can take place with any other FSM that is ready to execute the corresponding operation. For example, if an FSM has an operator ?msg, the FSM is triggered by the receipt of "msg" from any other FSM. Such operations are used to model a protocol's interactions with multiple users on multiple communication channels.

Formally, an FSM is a four-tuple $F=(\Sigma, V, \rho, s_0)$ where $\Sigma$ is an alphabet consisting of all of the FSM's i/o operations and an internal operation called Int; V is a finite set of states that the FSM may be in; $p: V \times \Sigma \to 2^V$ is a nondeterministic state transition function (e.g., machine!msg or machine?msg); and $s_0$ is the initial state of the FSM. An internal operation within the FSM is an unobservable action. While doing an internal transition from one state to another state, an FSM makes a state transition without interacting with any other FSM. See generally, Z. Kohavi, *Switching Theory and Finite Automata Theory*, McGraw-Hill, 275–315 (1978) and C. A. R. Hoare, "Communicating Sequential Processes," *Communications of the ACM*, Vol. 21, No. 8, 666–677 (August 1978).

As noted above, an FSM may be represented as a directed graph (V,E) where V is the set of states in the FSM and E is the set of edges or possible state transitions between states. Each state of an FSM is represented in a directed graph by a circle encircling the designation of the state. Each edge is labeled by an i/o operation (belonging to $\Sigma$) which either triggers the state transition or is a result of the state transition. Additionally, an edge may be labeled by two or more i/o operations which independently or in conjunction trigger the state transition or are the result of it. If e is an edge connecting one state $s_1$ to another state $s_2$, then its tail state is $s_1$ and its head state is $s_2$. Let the set of outgoing edges from state $s_3$ be ED ($s_3$). The head states of the edges in ED ($s_3$) are called successor states of $s_3$.

For notational purposes, an edge labeled by a*b denotes an edge labeled by an i/o operation a followed by an i/o operation b. The symbol "*" represents the boolean AND operator. Therefore, an edge labeled by ?ack0*?cancel is only triggered by the receipt of the messages "ack0" and "cancel". An edge labeled by ? ack0,!start is triggered by the receipt of the message ack0 and triggers the sending of the message start. An edge labeled by a+b denotes an edge labeled by two i/o operations: a and b. The symbol "+" represents the boolean OR operator. For example, and edge labeled by ?ack1+?start is triggered by the receipt of either of the messages "ack1" or "start".

Note that if an edge in one FSM is labeled by an i/o operation that has no corresponding operation in another FSM, the transition can never occur. For example, if an edge in machine1 is labeled machine2?msg, and machine2 contains no edge labeled machine1?msg, the transition in machine1 can never occur. The label of an edge e is given as label (e).

Directed graphs may be characterized as strongly connected or weakly connected. A directed graph is strongly connected if for each pair of distinct states in the FSM graph there exists a directed path from one to the other. A directed graph is weakly connected if there is no directed path to each state from every other state.

An FSM always starts in its initial state $s_0$. The initial state is labeled 0 and may be designated in the directed graph representing the FSM by the presence of a concentric circle surrounding the 0. When the FSM is in any given state it can execute any of the operations labeling a transition from that state. Recall that a protocol provides one or more services to the user of the protocol. These are also represented as an FSM called the service FSM. The i/o operations for the service FSM are service primitives of the protocol. Note: there is not necessarily a one-to-one mapping (or correlation) between the set of services provided by a protocol and the set of FSMs that can represent the protocol.

For any two FSMs $F_1$ and $F_2$, an FSM designated $F_1 \# F_2$ can be built that corresponds to the joint behavior off $F_1$ and $F_2$. The FSM $F_1 \# F_2$ is called the reachable FSM or the composition of $F_1$ and $F_2$. The process of constructing $F_1 \# F_2$ from the components $F_1$ and $F_2$ is called the reachability computation or composing and is well known in the art. Finding the reachable FSM is done by computing the reachable global states. A global state for $F_1 \# F_2$ is defined as a two-tuple $(s_1, s_2)$, where $s_1$ is the current state of $F_1$ and $s_2$ is the current state of $F_2$. In the reachability computation, there is a potential problem of state explosion, but procedures have been developed to reduce the problem. See, K. K. Sabnani, A. M. Lapone and M. U. Uyar, "An Algorithmic Procedure for Checking Safety Properties of Protocols," *IEEE Trans. Comm.*, Vol. 37, No. 9, 940–948, September 1989. The first procedure is not required, although use of it makes the second procedure more efficient.

Global states can be divided into two separate categories: stable and transient. In a stable state, at least one component machine is waiting for an external input. Otherwise, the state is transient. In a transient state, for every component machine, all outgoing transitions from the current state are internal. It is assumed that only a global state can be observed.

III. A Method for Conformance Testing of Protocols

A. Overview

Figure 5:
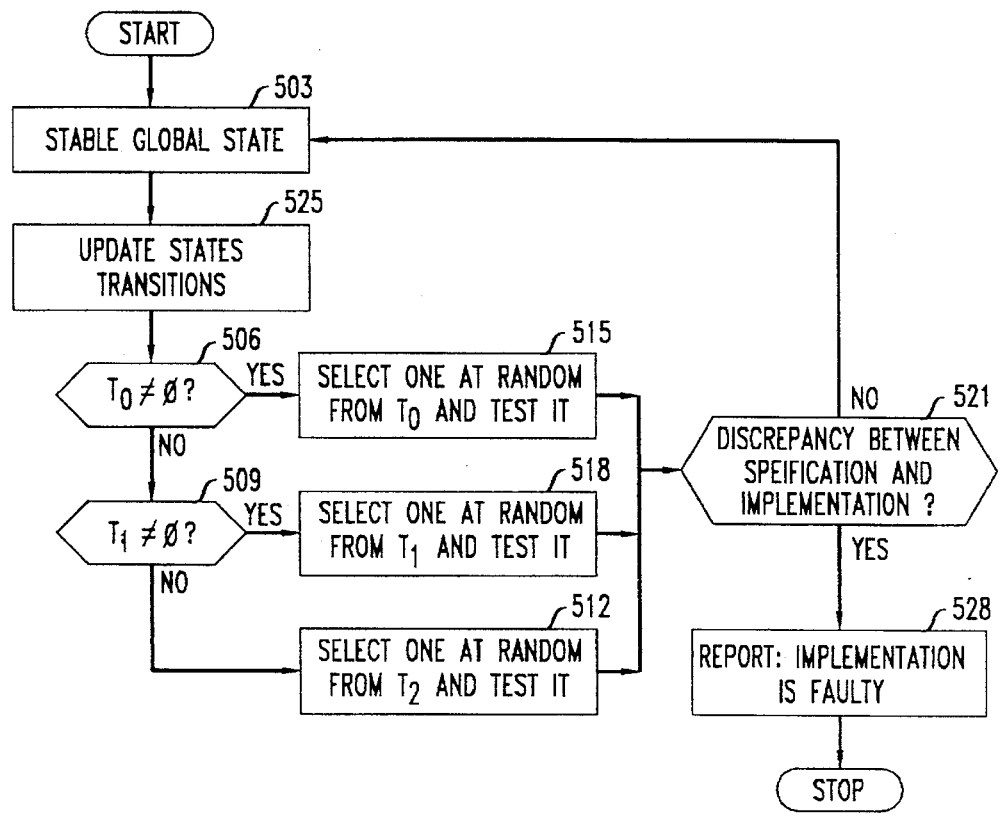
FIG. 5 illustrates a guided random walk method for conformance testing.

This section describes a method used in testing a collection of communicating FSM for conformance to a protocol specification. An illustrative embodiment of the invention for conformance testing is illustrated in FIG. 5. The method for conformance testing advantageously uses an adaptive guided random walk which attempts to cover all edges of the component FSMs of the protocol. Computation and traversal of the global FSM are intractable for most real-life protocols. The test is a directed random walk of the global behavior. The test attempts to cover all the edges of component FSMs, not all the edges in the global FSM (i.e. the composition). In this manner all parts of the component machines are exercised and it is assumed that the global states, but not the internal transitions, can be observed.

B. Adaptive Test Generation, Guided Random Walks, and Fault Coverage

Recall that there are two types of global states: stable and transient. In a stable state, at least one component machine is waiting for an external input; the current internal transitions are either waiting for a rendezvous or have matching transitions. In a transient state, there are no external outgoing transitions; the internal transitions are either waiting for a rendezvous or are dead locked, and the latter case is caused by a design error or a faulty implementation. When at a stable state, the global state and the current states of all the component machines can be observed but the transient states cannot.

Due to nondeterminism and unobservable behavior tests must be separated adaptively. More specifically, when we arrive at a stable state, we identify (observe) the current state and make a decision on which is the next input for test. The decision is made based on a guided (biased) random choice. Then we observe the next stable state and make another decision on the next input. Such a transition tour (test sequence) can be perceived as a guided random walk on the corresponding directed graph. R. Aleliunas, R. M. Karp, R. J. Lipton and C. Rackoff. "Random Walks, Universal Traversal Sequences, and the Complexity of Maze Problems," *Proceedings of the 20th Annual Symposium on Foundations of Computer Science*, October 1979, pp. 218–223.

To devise a complete test sequence (checking sequence) for the composite machine is out of question due to state explosion. However, from above, if there is complete fault coverage of each component machine, then there is also complete fault coverage of the composite machine. Therefore, it is advantageous to design a test sequence that has good fault coverage for each component machine.

C. Classification of States and Transitions

Note that during a test, a state of a component machine can be a component state of a stable global state or a transient global state. In the former case it is observable, and in the latter case it is not observable. Thus, states and transitions may be classified as follows:

State Classification—A state is tested if it has been observed at least once during the test. Otherwise, it is untested. A state is tested if it is part of a stable global state, which has been observed.

Transition Classification—An external input transition is: (i) untested, if it has never been exercised; (ii) weakly tested, if it is exercised but its ending state has not been observed; (iii) tested, if it is exercised and its ending state is observed. An internal transition can only be implicitly tested with a confidence measure.

Only external input transitions are observable, and only they can be tested for certain. Note that for each tested external input transition, its starting state is always observed before its exercise. Therefore, the only possible problem could be its ending state. A tested transition may still have a faulty ending state due to the presence of faults. There is little confidence with respect to a weakly tested transition, since its ending state has never been observed. Nothing can be inferred about untested transitions. During an adaptive test, a state can only go from untested to tested, and our confidence that a transition, internal or external, has been exercised can only increase.

Since internal transitions are not observable, they can never really be tested. First, it cannot even be observed that they are exercised. However, if they are on a path that consists of only internal transitions from the observed starting state to the observed ending state, we can infer that it is possible that they are exercised. Second, given observed starting and ending states, it is uncertain whether the ending state is reachable (it might be reached due to faults) through internal transitions. As a matter of fact, from the observations above, the problem is PSPACE-complete, due to the interactions handled between component machines. Thus, with this problem may be advantageously using the following heuristic approach.

A global state $s_i$ is internally reachable from $s_{i-1}$ if $s_i$ is reachable from $s_{i-1}$ through only internal transitions. If an internally unreachable state is observed (without any inputs), we know that there must be a fault. Otherwise, continue the test. Meanwhile, identify all the internal transitions that can be on the path from $s_{i-1}$ to $s_i$, and assign each of them a positive probability measure.

D. Test Generation Method

It is clear from the foregoing that the test generation procedure is adaptive. When at a stable global state: observe all the component states, identify all possible outgoing external transitions, select a corresponding input from them, and continue. The key issue is how to select the input.

The basic idea is simple: when choosing the next input signal, always select the external transitions that have not been well tested. The decision if a transition is well tested is based on the classification of transitions. When there is more than one transition to choose from in the same class, a random choice is made. This can be perceived as a guided random walk: a decision is made based on the class of transitions as a guide; but among transitions in the same class, a random selection is made. A test sequence, i.e. a series of input signals, can be constructed by continuing to select input signals until the resulting output signal does not conform to the specification or until the protocol implementation has been sufficiently tested. Pseudo-code for the method guided random walk follows:

```
begin
    initialize STATES;
    initialize TRANSITIONS;
    initial stable global state s_0 = (S_0^(1), ..., s_0^(k));
    for (i = 1 to N) do
        find all the current external input transitions T = (T_0,T_1,T_2);
        if (T_0 ≠ Ø) then /* there are untested transitions in T*/
            selected one at random form T_0 and test;
        else if (T_1 ≠ Ø) then /* there are weakly tested transitions
            in T*/
            select one at random from T_1 and test;
        else /* all the transitions in T are tested */
            select one at random from T_2 and test;
        observe stable global state s_i = (s_1^(1), ..., s_i^(k));
        update STATE, TRANSITION and OUTPUT;
        if (μ_{i-1}^(j),i = 0 for any 1≤j≤k) then
            return "fault"; /* unreachable component state
```

-continued

```
        observed */
    if (o'_{i-1}^{(j)},i ⊄ o_{i-1}^{(j)}, i for any 1≤j≤k) then
        return "fault"; /* impossible external output observed */
    end
end
```

FIG. 5 illustrates the method. While taking a guided random walk through the system, a testing sequence is generated from the selected external input signal for the next step of the walk. An external input is selected for an external transition in the priority of untested, weakly tested and tested transition, i.e. a "guided" walk by enforcing the priority. More particularly, at a stable state 503, $T=T_0 \cup T_1 \cup T_2$ consists of all the external input transitions from the current state in the component machines. Here $T_0$, $T_1$, and $T_2$ are the untested, weakly tested, and tested transitions, respectively. In step 506 the method first attempts to choose an untested transition in $T_0$. If it is empty, then the method tries to select a weakly tested transition in $T_1$ in step 509. If it is also empty, the transition in $T_2$ is selected in step 512. Obviously, $T \neq \emptyset$ since we are at a stable global state. If there are more than one external inputs to choose from in the same priority class, one is selected uniformly at random, i.e. a "random" walk as shown in steps 512, 515 and 518. Once the input is selected, the implementation is tested and the resulting output is compared to the specification in step 521. If a discrepancy is found, a report of the fault is generated in step 528. If no fault is detected, the STATES and TRANSITIONS data structures are updated in step 525 and the method returns to a global state in step 503 to generate the next input test signal.

In a component machine $F_j$, for a pair of consecutively observed states $<s_{i-1}^{(j)}, s_i^{(j)}>, 1 \leq j \leq k$, $o_{i-1,i}^{(j)}$ are the external outputs, which are reachable through internal transitions only, i.e., they could be observed during the current state transition. On the other hand, $o_{i-1,i}'^{(j)}$ are the observed external outputs. Obviously, $o_{i-1,i}'^{(j)} \subseteq o_{i-1,i}^{(j)}$. However, if $o_{i-1,i}'^{(j)} \not\subset o_{i-1,i}^{(j)}$, then an unexpected external output has been observed and faults are detected.

Figure 6:
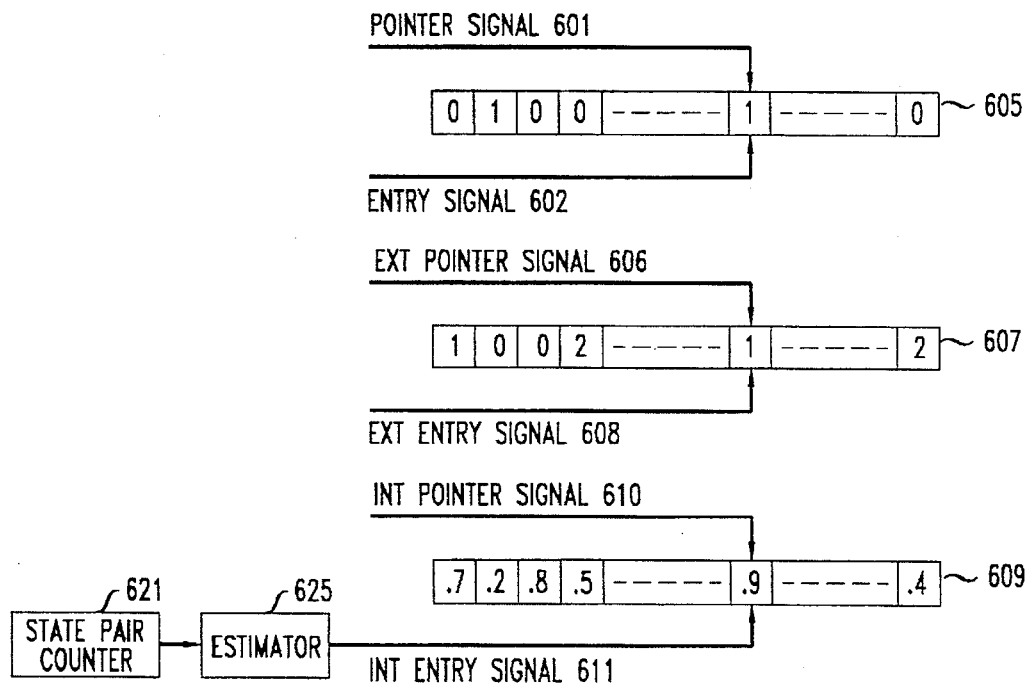
FIG. 6 is a schematic representation of the data structures for conformance testing.

In the preferred embodiment, data structure STATES is advantageously used to keep track of the status of states, and TRANSITIONS is used to keep track of transitions, of each component machine. The data structure STATES can be implemented simply by a bit vector or shift register 605 for each component machine as illustrated in FIG. 6, where each entry corresponds to a state. If a state is tested then the entry is 1, otherwise 0. Obviously, each update has a constant cost. Pointer signal 601 specifying the present global state may be generated from step 503 and step 521 may generate entry signal 602 to control shift register 605.

The data structure TRANSITIONS can be advantageously implemented by an integer array EXT 607 and a real array INT 609 for each component machine as shown in step 525. Each entry of EXT corresponds to the status of an external input transition; the values are 0, 1, and 2, corresponding to untested, weakly tested, and tested. Each entry of INT corresponds to the status of an internal transition; the values are the confidence measure that it is tested.

Before the test, all the entries of STATES, EXT, and INT have value 0. When a state is observed in step 503, set the corresponding entry in STATE to 1. To update transitions is more involved. When an external input transition is tested and its ending state observed, the transition is tested and obtains a value 2. This is reflected in array EXT 607. Ext Pointer Signal 606 and Ext Entry Signal 608 may be generated in step 521 when the ending state is known. If the ending state has never been observed then the transition is weakly tested, with a value 1. The values of entries of EXT can only be increased.

As for internal transitions, since they are not observable, their test status must be estimated in a statistical sense. Given two observed global states $s_{i-1}$ and $s_i$, first verify if $s_i$ is reachable from $s_{i-1}$ by internal transitions only. If not, there must be a fault, and the testing is aborted. Otherwise, compute all the internal transitions that are possibly on the path from $s_{i-1}^{(j)}$ to $s_i^{(j)}$ in each component machine $F_j$, $j=1, \ldots, k$, and increase the corresponding entry of INT for each such transition accordingly. The INT values after each internal transition can be updated. However, this is time inefficient, and thus an efficient data structure is described next.

In each component machine $F_j$, for each pair of states $<s_{i-1}^{(j)}, s_i^{(j)}>$ compute and store the number $\mu_{i-1,i}^{(j)}$ of internal transitions that could be on a path (of internal transitions only) from $s_{i-1}^{(j)}$ to $s_i^{(j)}$ in state pair counter 621. Also set a pointer from $<s_{i-1}^{(j)}, s_i^{(j)}>$ to the corresponding entries in INT. Although one could initialize the data structure for all pairs before test generation, as a practical matter one need only compute each $<s_{i-1}^{(j)}, s_i^{(j)}>$ pair entry the first time it is needed and save the result.

When $s_i^{(j)}$ after $s_{i-1}^{(j)}$ are observed, if the associated counter $\mu_{i-1,i}^{(j)}=0$, then $s_i^{(j)}$ is not reachable from $s_i^{(j)}$ and a fault is detected. Otherwise, we add $1/\mu_{i-1,i}^{(j)}$ as determined by Estimator 625 to each internal transition via Int Entry Signal 611 as pointed to by $<s_{i-1}^{(j)}, s_i^{(j)}>$ using Int Pointer Signal 610. Note that if the result exceeds 1 then take value 1 instead.

Each update of states and external transitions takes constant time. For a sequence of $\sigma$ internal transitions, the amortized cost of updating the confidence measure in INT is $O(\sigma)$. This assertion may be demonstrated by noting that for updating states we access bit vectors through a constant number of pointers. To efficiently update external transitions, three doubly linked lists of transitions in $T_0$, $T_1$, and $T_2$, respectively, are needed. The header of each list contains a counter $n_i$ of the current entries and an array of $n_i$ pointers to and from each entry in the list. Furthermore, there are pointer between an entry in the list and its corresponding entry in EXT. Obviously, after each test of an external transition, an update of EXT and the corresponding linked list takes constant time. When deciding to select an entry from a list $T_i$, find the current number of entries in the header of $T_i$ by reading the counter $n_i$, generate a number uniformly at random $1 \leq p \leq n_i$, select the pth pointer in the header, and access to the corresponding entry in the list. The whole process of each selection takes constant time.

To update the confidence measure for internal transitions in INT in amortized constant time, do the following—for a pair $(s_{i-1}^{(j)}, s_i^{(j)})$, compute $\mu_{i-1,i}^{(j)}$ in time proportional to $m_j$, the number of internal transition in $F_j$. The total cost of the initialization is $$O\left(\sum_{j=1}^{k} m_j\right).$$

For a sequence of $\sigma$ internal transitions, to update the entries in INT, it takes time $$O\left(\sigma \sum_{j=1}^{k} m_j\right).$$

However, delaying the updating of INT values can be done as follows: have a counter $c_{i-1}^{(j)},i$ associated with each pair $<s_{i-1}^{(j)}, s_i^{(j)}>$ with an initial value 0. Whenever there are internal transitions from $s_{i-1}^{(j)}$ to $s_i^{(j)}$, increase the counter value by 1. When checking for termination, for each pair $<s_{i-1}^{(j)}, s_{i_k}^{(j)}>$, update the $\mu_{i-1,i}^{(j)}$ entries in INT as min $\{1, c_{i-1,i}^{(j)}/\mu_{i-1,i}^{(j)}\}$. The cost is $$O\left(\sigma + \sum_{j=1}^{k} m_j n_j^2\right).$$

Check for termination when $$\sigma > \sum_{j=1}^{k} m_j n_j^2,$$

where $\sigma$ is the number of internal transitions since the last checking for termination. The amortized cost is a constant for each updating.

We keep track of the coverage of individual components, not of the composite machine to avoid exploding the states. Because we do not do a reachability computation, we cannot, of course, say absolutely whether a current global state $s_i$ can be reached from the previous one $s_{i-1}$. However, some faults may still be detected as outlined below.

For each component machine, determine if $s_i^{(j)}$ is reachable from $s_{i-1}^{(j)}$.j =1, . . . , k. Consult INT for $\mu_{i-1,i}^{(j)}$ associated with $<s_{i-1}^{(j)}, s_i^{(j)}>$. If $\mu_{i-1,i}^{(j)}=0$ then the procedure has arrived at an unreachable state; the implementation machine has faults and testing is stopped. Also consult INT for the possible outputs associated with state pair $<s_{i-1}^{(j)}, s_i^{(j)}>$. Let $0_{i-1,i}^{(j)}$ be the outputs in the list. If the observed outputs $o_{i-1,i}^{(j)} \not\subset o_{i-1,i}^{(j)}$ then there unexpected outputs and the machine is faulty. If none of the above happens, continue testing until there is some confidence in the correctness of the implementation.

It should be noted that the method may be advantageously used in conjunction with a protocol thinning procedure to reduce the overall testing problem to a number of smaller problems. In the protocol thinning procedure the given collection of FSMs that represent a protocol are pruned to provide only one service; the pruned machines are then used for testing. This reduces the state explosion problem by transforming the problem to one of checking a set of smaller pruned machines. See, David Lee, Krishan K. Sabnani, David M. Kristol and Sanjoy Paul, "Conformance Testing of Protocols Specified as Communicating FSMs," *IEEE Infocom*'93, vol. 1, pp. 115–127, San Francisco, Calif., Mar.30–Apr. 1, 1993.

E. Termination Criteria

If all external input transitions are tested, there is confidence that they are correct; however, we are not sure of the correctness of their ending states. If some external transitions are weakly tested or untested, there is little confidence that the test sequence has high fault coverage. A reasonable termination criterion for external input transitions is that they all at least be tested.

As for internal transitions, if all of them have been assigned a number close to 1 in INT, then there is high confidence that they are correct. More specifically, choose a predetermined threshold or termination criterion value a $\delta>0$. If all the $\mu_{i-i,i}^{(j)}$ entries in INT have value larger than $1-\delta$ then there is reasonable confidence that the internal transitions are well tested. Such a value $\delta$ can be determined by the implementation environment and stimulation.

F. No-Progress Problem

A test is making progress if transitions are upgraded, i.e., the EXT values of external input transitions are being increased. (Note that INT values are always increasing.) Under certain circumstances, a test may not make any progress, and thus the procedure must be able to detect the no-progress problem and break out of the impasse.

In the preferred embodiment, a counter is kept of upgraded external input transitions. If it does not increase for a while then we notice that the test has made no progress. Special measures have to be taken to break out of this situation. The no progress problem could be caused by enforcing priority when choosing the next external input transition to test; the test sequence may trace the composite machine along a loop, and there is no way we can find it directly. One way to break the loop is to relax the priority of the next transition to test temporarily, i.e., select the next external input transition to exercise randomly, disregarding classes. After a few iterations, resume normal test operation.

This disclosure deals with a method and apparatus for testing protocols. The method and apparatus have been described without reference to specific hardware or software. Instead, the method and apparatus have been described in such a manner that those skilled in the art can readily adapt such hardware or software as may be available or preferable.

We claim:

1. A method of testing a protocol to determine if said protocol conforms to a specification, said protocol comprising a set of communicating finite state machines, said set of communicating finite state machines further comprising states and a plurality of classes of transitions, wherein each transition in each class in said plurality of classes of transitions comprises an input signal and corresponding output signal, said method comprising the steps of:

choosing a selected class of transitions from said plurality of classes of transitions according to a priority scheme, said plurality of classes of transitions comprising a class of untested external transitions, a class of weakly tested external transitions and a class of tested external transitions and wherein said priority scheme chooses, in decreasing order of priority, said class of untested external transitions, said class of weakly tested transitions, and said class of tested external transitions;

identifying a set of input signals corresponding to the input signals of the transitions in said selected class of transitions, randomly choosing a selected input signal from said of input signals, applying said selected input signal to said set of communicating finite state machines to generate the corresponding output signal, and determining whether said corresponding output signal conforms to said specification.

2. The method of claim 1 wherein said states comprise tested and untested states.

3. A method of testing a protocol to determine if said protocol conforms to a specification, said protocol comprising a set of communicating finite state machines, said set of communicating finite state machines further comprising states and a plurality of classes of transitions, wherein each transition in each class in said plurality of classes of transitions comprises an input signal and associated output signal, said method comprising the steps of:

a) applying a set of conformance input signals to said set of communicating finite state machines to generate a corresponding set of conformance output signals, and b) determining whether said corresponding set of conformance output signals conforms to said specification, wherein each conformance input signal in the set of conformance input signals has been generated by the steps of:

i. choosing a selected class of transitions from said plurality of classes of transitions according to a priority scheme, said plurality of classes of transitions comprising a class of untested external transitions, a class of weakly tested external transitions and a class of tested external transitions and wherein said priority scheme chooses, in decreasing order of priority, said class of untested external transitions, said class of weakly tested transitions, and said class of tested external transitions, ii. identifying a set of input signals corresponding to the input signals of the transitions in said selected class of transitions, and iii. randomly choosing a selected input signal from said set of input signals as said each conformance input signal.

4. A method of generating a sequence of signals for conformance testing of a protocol to a specification, said protocol comprising a set of communicating finite state machines, said set of communicating finite state machines further comprising states and a plurality of classes of transitions, wherein each transition in each class in said plurality of classes of transitions comprises an input signal and corresponding output signal, said method comprising the steps of:

choosing a selected class of transitions from said plurality of classes of transitions according to a priority scheme, said plurality of classes of transitions comprising a class of untested external transitions, a class of weakly tested external transitions and a class of tested external transitions and wherein said priority scheme chooses, in decreasing order of priority, said class of untested external transitions, said class of weakly tested transitions, and said class of tested external transitions;

identifying a set of input signals corresponding to the input signals of the transitions in said selected class of transitions, randomly choosing a selected input signal from said of input signals, applying said selected input signal to said set of communicating finite state machines to generate the corresponding output signal, determining whether said corresponding output signal conforms to said specification; and repeating the steps of choosing, identifying, randomly choosing, applying and determining until either said corresponding output does not conform to said specification or until a termination criteria is met.

5. The method of claim 1 wherein said plurality of classes of transitions further comprises internal transitions wherein said internal transitions are either untested or tested with a confidence measure.

* * * * *